(12) United States Patent
Hong

(10) Patent No.: US 7,515,403 B2
(45) Date of Patent: Apr. 7, 2009

(54) FLAT PANEL DISPLAY DEVICE AND FRAME FOR THE SAME

(75) Inventor: Chang Sung Hong, Daegu (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 11/716,640

(22) Filed: Mar. 12, 2007

(65) Prior Publication Data

US 2008/0074349 A1 Mar. 27, 2008

(30) Foreign Application Priority Data

Sep. 21, 2006 (KR) ...................... 10-2006-0091588

(51) Int. Cl.
*G06F 1/16* (2006.01)
(52) U.S. Cl. ..................................... 361/681; 248/473
(58) Field of Classification Search ................. 361/681; 345/55; 248/473
See application file for complete search history.

(56) References Cited

U.S. PATENT DOCUMENTS

| | | | | |
|---|---|---|---|---|
| 5,768,096 A | * | 6/1998 | Williams et al. ............ | 361/681 |
| 6,494,429 B2 | * | 12/2002 | Tajima ........................ | 248/473 |
| 6,813,159 B2 | * | 11/2004 | Irie et al. .................... | 361/752 |
| 2005/0236548 A1 | | 10/2005 | Maruta | |
| 2006/0061945 A1 | * | 3/2006 | Kim ........................... | 361/681 |
| 2006/0128503 A1 | * | 6/2006 | Savarese et al. ............. | 473/353 |
| 2006/0133017 A1 | * | 6/2006 | Bang .......................... | 361/681 |
| 2006/0238446 A1 | * | 10/2006 | Takahashi et al. ............. | 345/55 |
| 2007/0258196 A1 | * | 11/2007 | Koskinen et al. ............ | 361/681 |

* cited by examiner

*Primary Examiner*—Lisa Lea-Edmonds
(74) *Attorney, Agent, or Firm*—Birch, Stewart, Kolasch & Birch, LLP

(57) ABSTRACT

Provided is a frame for flat panel display device so that a single frame can be variably used for various types of display devices. The frame includes: a first frame extending in a first direction and having a coupling section formed in a lengthwise direction of the first frame; a second frame spaced apart by a predetermined distance from the first frame, extending in the first direction and including a coupling section formed in a lengthwise direction of the second frame; and at least one third frame extending in a second direction crossing the first direction and coupled with the coupling sections of the first and second horizontal frames.

20 Claims, 11 Drawing Sheets

FLAT PANEL DISPLAY DEVICE AND FRAME FOR THE SAME

BACKGROUND OF THE INVENTION

1. Field of the Invention

The present invention relates to a flat panel display device, and more particularly, to a frame for a flat panel display device to improve the interchangeability between devices.

2. Description of the Related Art

In general, a cathode-ray tube (CRT) has been widely used for a monitor of a device, such as a television, a measuring instrument, a data terminal or the like. However, the CRT has become an obstacle to the miniaturization, slimness and lightness of electronic appliances due to the weight and volume thereof.

To satisfy the increasing requests for the miniaturization, slimness and lightness of electronic appliances, flat display devices, such as a liquid crystal display (LCD) device, a plasma display panel (PDP), and the like which are substitute for the CRT, have been developed and popularized.

Frames for flat panel display devices according to the related art are characterized by each of them being integrally molded. In detail, each of the frames as described above is molded of steel plate such that the size and shape of the frame and the location of a printed circuit board (PCB) are fixed.

The frame for the display device is coupled with a rear surface of the display module. A variety of elements for operating the display devices, such as PCB, main board, power board and the like, are mounted to the other side of the frame for the display device. Bosses and coupling holes are formed in the frame for the display device, such that fixing locations for a variety of elements coupled with the frame can be secured.

However, since the frame for flat panel display device according to the related art as described above is integrally formed such that the mount locations of respective elements are fixed, the frames should be manufactured differently depending on the types of display modules and the sizes of the PCBs, resulting that frame sharing cannot be achieved. Accordingly, a new metal mold should be manufactured in the development of a new product. As a result, cost and time taken in manufacturing a new metal mold are added whenever a model is changed. Also, since the entirety of the frame is made of the steel plate, a use amount of the steel plate increases, so that manufacturing cost and product weight increase.

Additionally, the heavier weight and larger volume of the frame may cause a difficulty in storage and an increase in logistics costs. That is, since the entirety of the frame is integrally molded, increasing space relative to a volume of the frame is needed for storage of the product.

SUMMARY OF THE INVENTION

Accordingly, the present invention is directed to a flat panel display device and a frame for the same that substantially obviate one or more problems due to limitations and disadvantages of the related art.

An object of the present invention is to provide a frame for a flat panel display device on which a variety of sizes and shapes of PCBs can be mounted.

Another object of the present invention is to provide a frame for a flat panel display device which can be mounted on a variety of sizes of display modules.

A still another object of the present invention is to provide a flat panel display device in which a frame is configured to have a variable horizontal/vertical length and a supporting member involved in the frame is configured to have a variable securing position so as to realize a frame sharing.

An even another object of the present invention is to provide a frame for a flat panel display device, which need not to manufacture a new metal mold in the development of a new product anymore, thereby reducing cost and time taken for making metal molds.

A further object of the present invention is to provide a frame for a flat panel display device in which steel plate is applied only to chassis parts, reducing the manufacturing cost and the product weight.

A still further object of the present invention is to provide a frame for a flat panel display device, which can reduce a logistics cost due to a reduction of the weight and volume of the frame as described above.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a frame for a flat panel display device, including: a first frame extending in a first direction and having a coupling section formed in a lengthwise direction of the first frame; a second frame spaced apart by a predetermined distance from the first frame, extending in the first direction and including a coupling section formed in a lengthwise direction of the second frame; and at least one third frame extending in a second direction crossing the first direction and coupled with the coupling sections of the first and second frames.

In another object of the present invention, there is provided a frame for a flat panel display device, including: at least two vertical frame assemblies; and at least one horizontal frame coupled to at least one of the vertical frame assemblies and extending in a direction, wherein the at least two vertical frame assemblies comprise: a first vertical frame extending in a direction; and a second vertical frame which can overlap the first vertical frame to slide into or withdraw from the first vertical frame.

In a further object of the present invention, there is provided a frame for a flat panel display device, including: a first horizontal frame; a second horizontal frame; and a vertical frame assembly coupled substantially perpendicular to the first and second horizontal frames at any positions, which are variable, and the length of the vertical frame assembly can be changed.

In a still further object of the present invention, there is provided a flat panel display device, including: a flat display module on which an image is provided; a front panel protecting a front face of the flat display module; a back cover protecting a rear face of the flat display module; a frame assembly provided in a extensible form on the rear face of the flat display module; and at least one board supported by the frame assembly.

According to the present invention, the sharing of a frame for a flat panel display device becomes possible, thereby reducing cost for developing products and simplifying manufacturing processes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
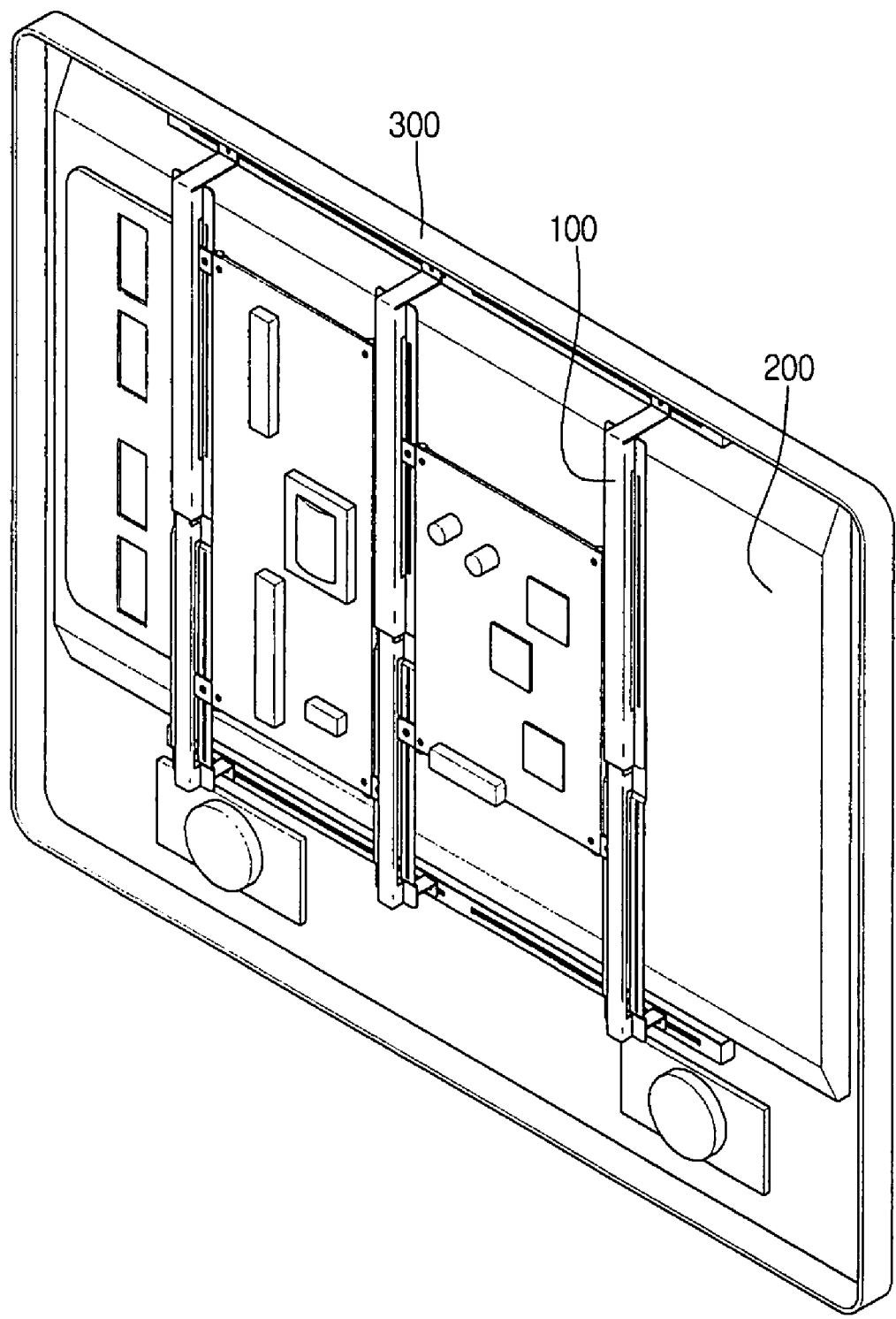
FIG. 1 is a perspective view showing a coupling structure of a flat panel display device according to the present invention.
Figure 2:
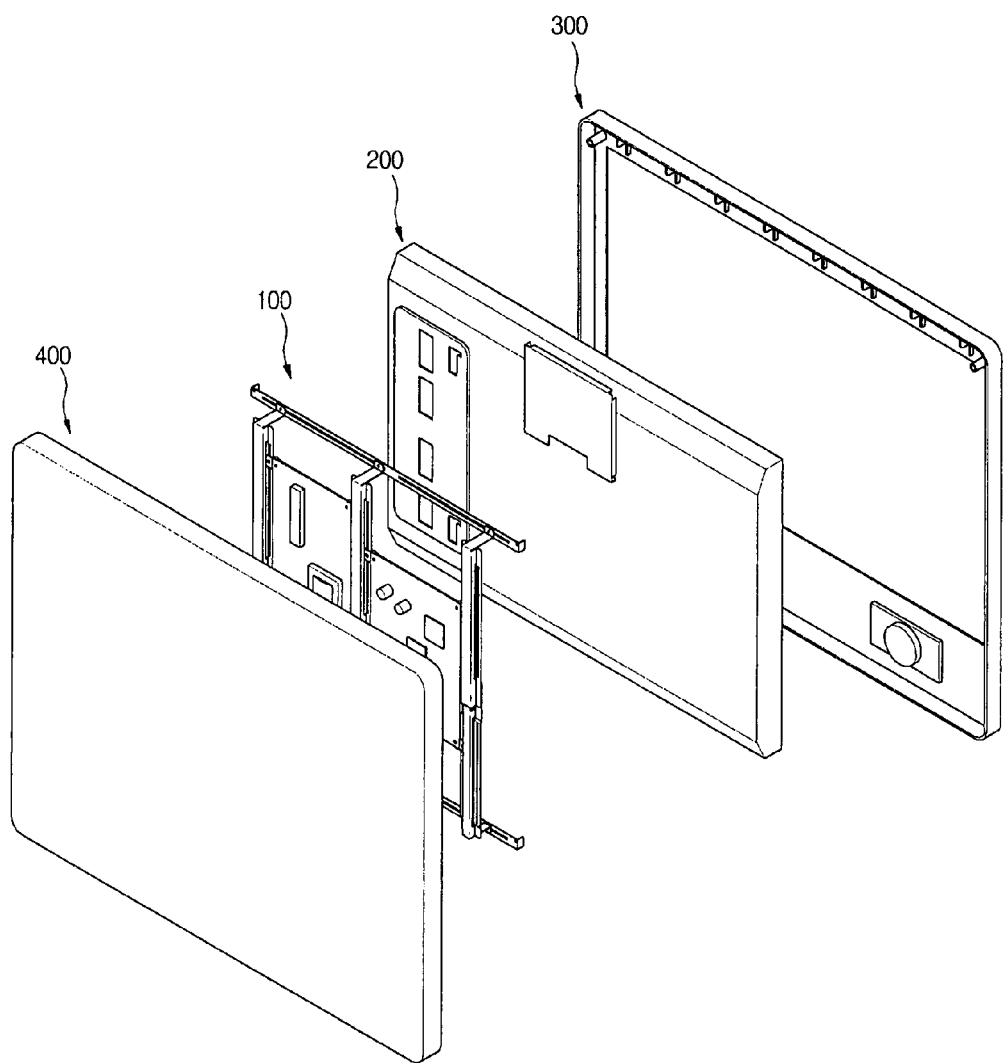
FIG. 2 is an exploded perspective view showing a structure of a flat panel display device according to the present invention.

FIG. 1 is a perspective view showing a coupling structure of a flat panel display device according to the present invention and FIG. 2 is an exploded perspective view showing a structure of a flat panel display device according to the present invention.

Referring to FIGS. 1 and 2, the flat panel display device includes a front cabinet 300 forming a front shape of the flat panel display device, a display module 200 coupled to a rear side of the front cabinet 300, for implementing an image, a frame assembly 100 coupled with one side of the display module 200, for securing the display module 200 and being mounted with PCB and the like, and a back cover forming a rear shape of the flat panel display device and protecting the display module 200.

In detail, the front cabinet 300 forms the front shape of the flat panel display device, and, at the same time, prevents the display module 200 from being damaged by an external shock. The back cover 400 protects the display module 200 from an external shock and acts as barrier against electromagnetic interference (EMI).

The display module 200 is configured to have a substantially rectangular shape, with upper and lower boards attached. Why the display module 200 has a rectangular shape is to implement a preferred wide screen for a user.

Also, the frame assembly 100 is coupled with a rear side of the display module 200 so that a fixed position of the display module 200 mounted on the rear side of the front cabinet 300 can be supported. A frame for the flat panel display device according to the present invention has a characteristic that the frame assembly 100 is configured to have an adjustable vertical length so as to be coupled with the display modules 200 having a variety of sizes.

Moreover, the frame assembly 100 is provided on one surface thereof with various components, such as a PCB, power board, main board or the like for operating the display device. The frame for the flat panel display device according to the present invention has another characteristic that a vertical frame assembly 120 in FIG. 3 is configured to move in the left and right directions so as to be coupled with a variety of sizes and shapes of PCBs.

Hereinafter, the frame assembly 100 will be more fully described.

Figure 3:
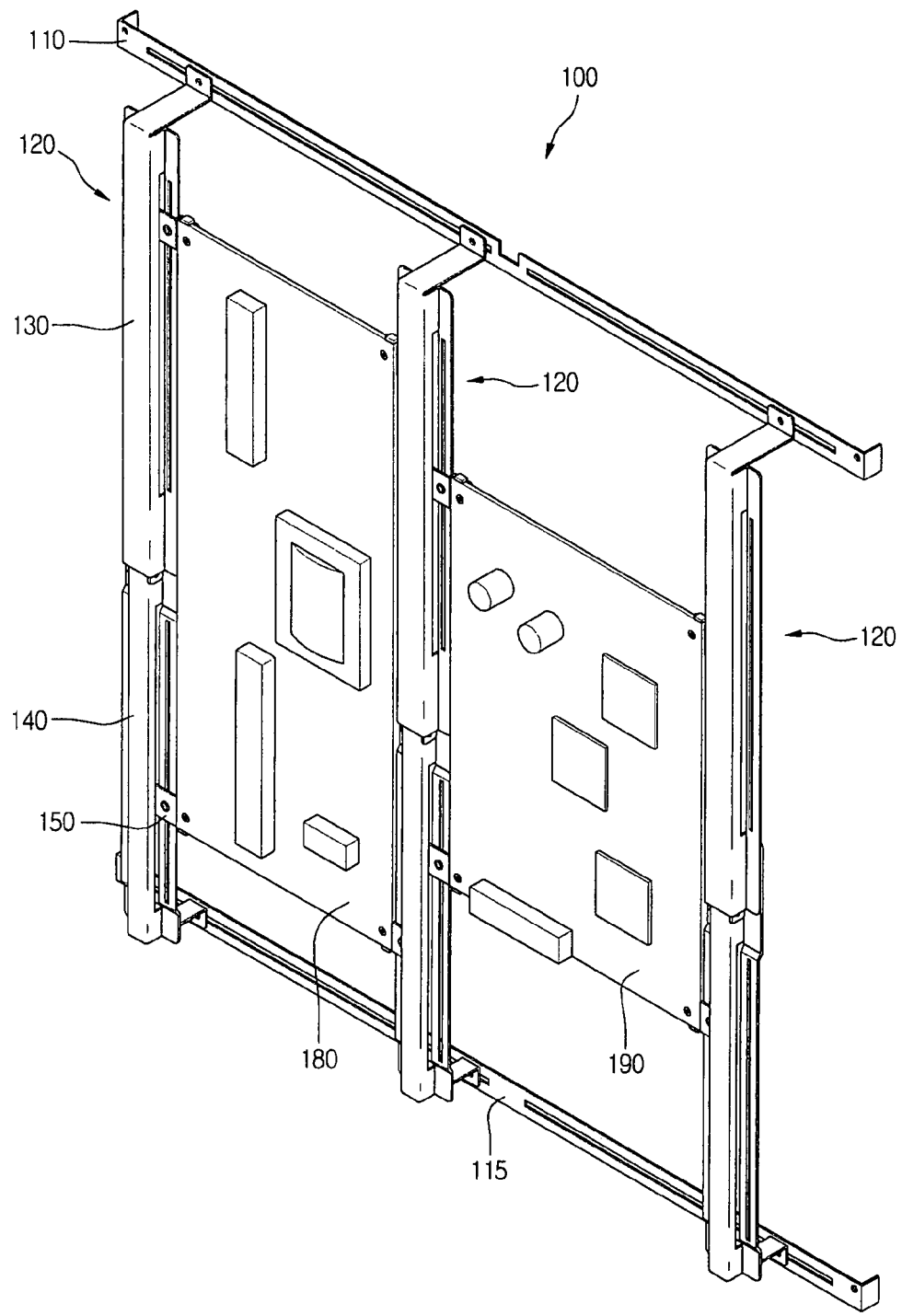
FIG. 3 is a perspective view showing a structure of a frame assembly of a flat panel display device according to the present invention.

FIG. 3 is a perspective view showing a structure of a frame for the flat panel display device according to the present invention.

Referring to FIG. 3, the frame assembly 100 of the flat panel display device includes a first horizontal frame 110 forming an upper end of the frame assembly 100 and having a guide slot along its length, a second horizontal frame 115 forming a lower end of the frame assembly 100 and having a guide slot along its length, at least one of vertical frame assemblies 120 coupled with the first and second horizontal frames 110 and 115, and a supporting member 150 coupled with the vertical frame assembly 120, for supporting the secure positions of components which are mounted to the frame assembly 100. Also, a variety of boards such as a power board 180, a main PCB 190 or the like are secured to the supporting member of the frame assembly 100.

More particularly, the first and second frames 110 and 115 form the upper and lower ends of the frame assembly 100, respectively. At least one of the vertical frame assemblies 120 is connected to the guide slots 113 of the first and second horizontal frames 110 and 115. Since the guide slots 113 run along the lengths of the horizontal frames 110 and 115, a user can easily adjust the coupling position of the vertical frame assembly 120 according to the sizes and shapes of the components such as a power board 180 or main PCB 190.

Meanwhile, the vertical frame assembly 120 includes a first vertical frame 130 forming an upper part of the vertical frame assembly 120, and a second vertical frame 140 having one end portion which overlaps the first vertical frame 130 such that the second vertical frame 140 can slide into and withdraw from the first vertical frame 130. As describes above, the second vertical frame 140 slides into or withdraws from the inside of the first vertical frame 130, so that it becomes possible to adjust the entire length of the vertical frame assembly 120. Accordingly, the present invention has an effect that can allow the frame assembly 100 to be mountable to the display modules 200 having various sizes.

The vertical frame assembly 120 is connected to the first horizontal frame 110 at one end and to the second horizontal frame 115 at the other end. As described above, the vertical frame assembly 120 is coupled with the guide slot (see 113 of FIG. 4) of the first horizontal frame 110 and the second horizontal frame 115. Accordingly, the present invention has an effect that the various sizes and shapes of PCBs can be coupled with the frame assembly 100. Also, since a separate coupling member such as a bolt can secure the vertical frame assembly 120 to the horizontal frames 110 and 115, the present invention has an advantage of easily fastening and loosening the vertical frame assemblies 120.

While the drawing shows only the three vertical frame assemblies 120, the present invention is not limited thereto. Preferably, the number of the vertical assemblies 120 can be modified in the scope of the present invention, depending on the numbers and shapes of components to be mounted to the frame assembly 100.

The vertical frame assembly 120 is coupled with one or more of supporting members 150. More particularly, the first vertical frame 130 and the second vertical frame 140 have rail-shaped insert slots and coupling slots where the supporting members 150 are secured, so that the supporting members can be secured to variable positions. Accordingly, changeability of the coupling position as described above gives an effect that the supporting members 150 can be coupled with a power board 180 and PCB 190 having a variety of sizes and shapes.

Each element of the frame assembly 100 will be further described below.

Figure 4:
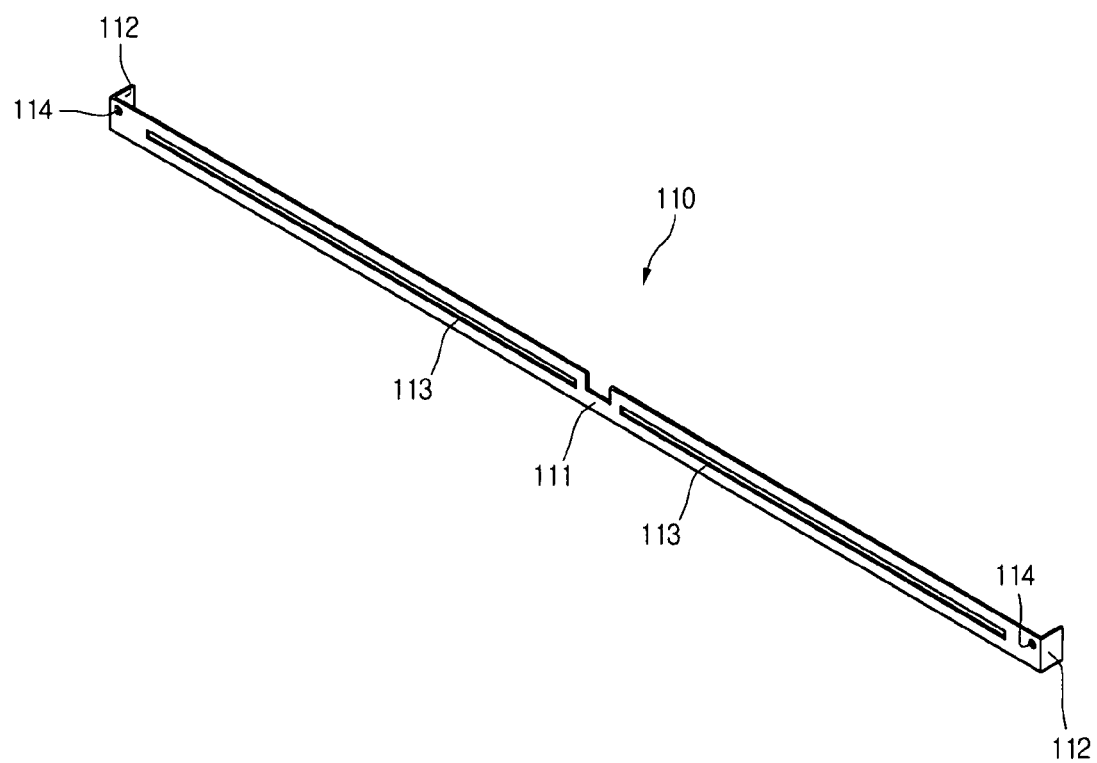
FIG. 4 is a perspective view showing a structure of a first horizontal frame of a frame for a flat panel display device according to the present invention.

FIG. 4 is a perspective view showing the structure of the first vertical frame in the frame for the flat panel display device.

Referring to FIG. 4, the first vertical frame includes a long rod-shaped frame 111, bent sections 112 which are formed at both ends of the frame 111 and coupled with the display module 200 for supporting a secure position of the display module 200, a guide slot 113 formed approximately at the center of the width along the length of the frame 111, and one or more of coupling holes 114 which are formed at one or two ends of the frame 111 for being coupled with a vertical frame assembly 120 as described below.

Figure 7:
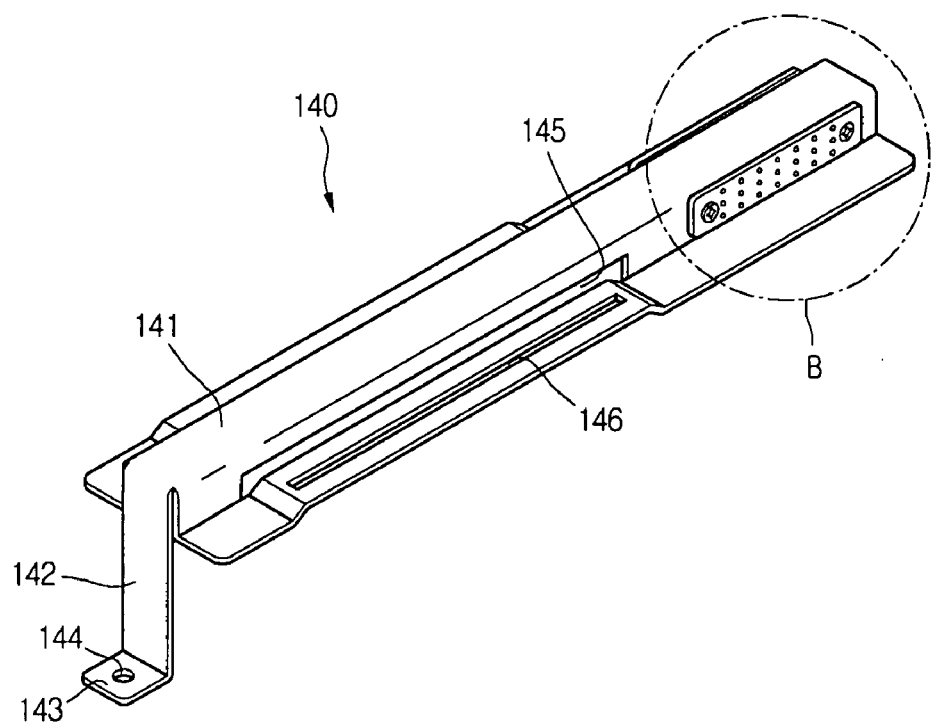
FIG. 7 is a perspective view showing a structure of a second vertical frame of a frame for a flat panel display device according to the present invention.

In particular, the first horizontal frame 110 forms the upper end of the frame assembly 100. The first horizontal frame 110 is formed of steel plate and has a long rod-like shape. The guide slot 113 is approximately formed at the center of the width along the length of the first horizontal frame 110. The guide slot 113 is coupled with the vertical frame assembly 120. That is, the coupling hole 144 of the vertical frame assembly 120 in FIG. 7 is overlaid on the guide slot 113, so that the separate coupling members such as bolt and nut can secure the coupling hole 144 to the guide slot 113. Herein, the guide slot 113 is formed along almost the entire length of the first horizontal frame 111, so that a user can select the coupling position, as the user desires.

Meanwhile, the second horizontal frame 115 forms the lower end of the frame assembly 100. The second horizontal frame 115 has almost the same shape as the first horizontal frame 110. Thus, a detailed explanation for the second horizontal frame 115 will be omitted.

As described above, the guide slots 113 are formed along the lengths of the first and second horizontal frames 110 and 115. Since the vertical frame assembly 120 can be freely secured to the guide slots 113 at the desired location, the vertical frame assembly 120 has an effect that can be mounted with a variety of sizes and shapes of PCBs. Furthermore, the vertical/horizontal lengths of the frame and the secure position where the supporting member is secured are changeable, so that the present invention has an effect on the frame sharing.

Figure 5:
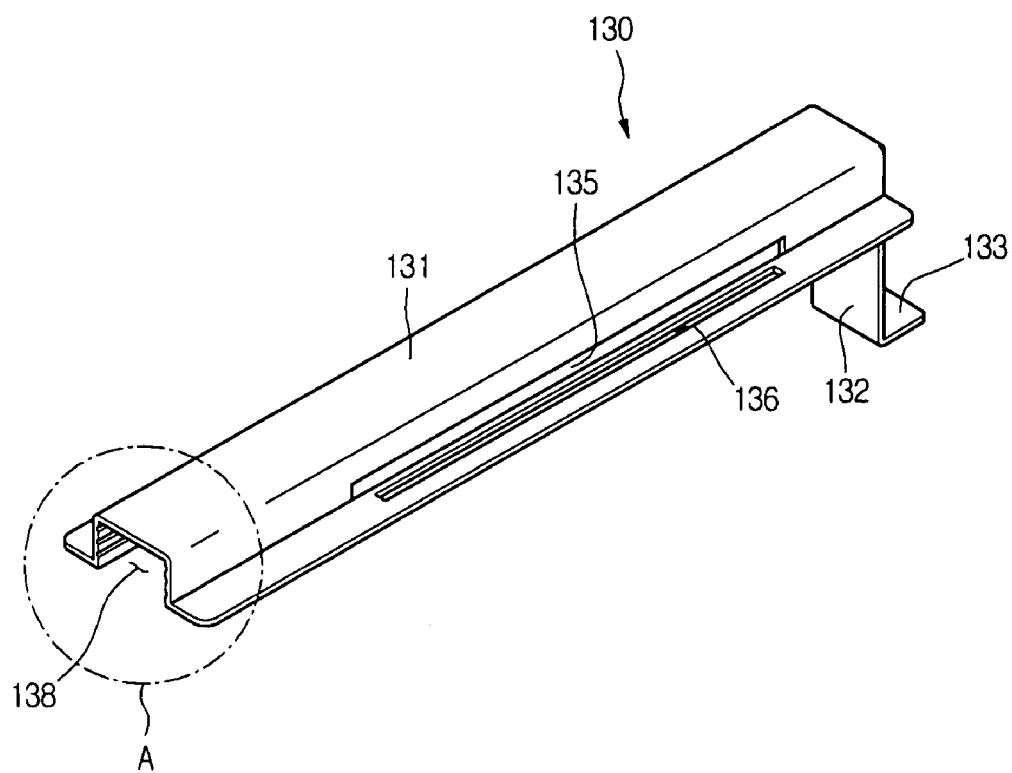
FIG. 5 is a perspective view showing a structure of a first vertical frame of a frame for a flat panel display device according to the present invention.
Figure 6:
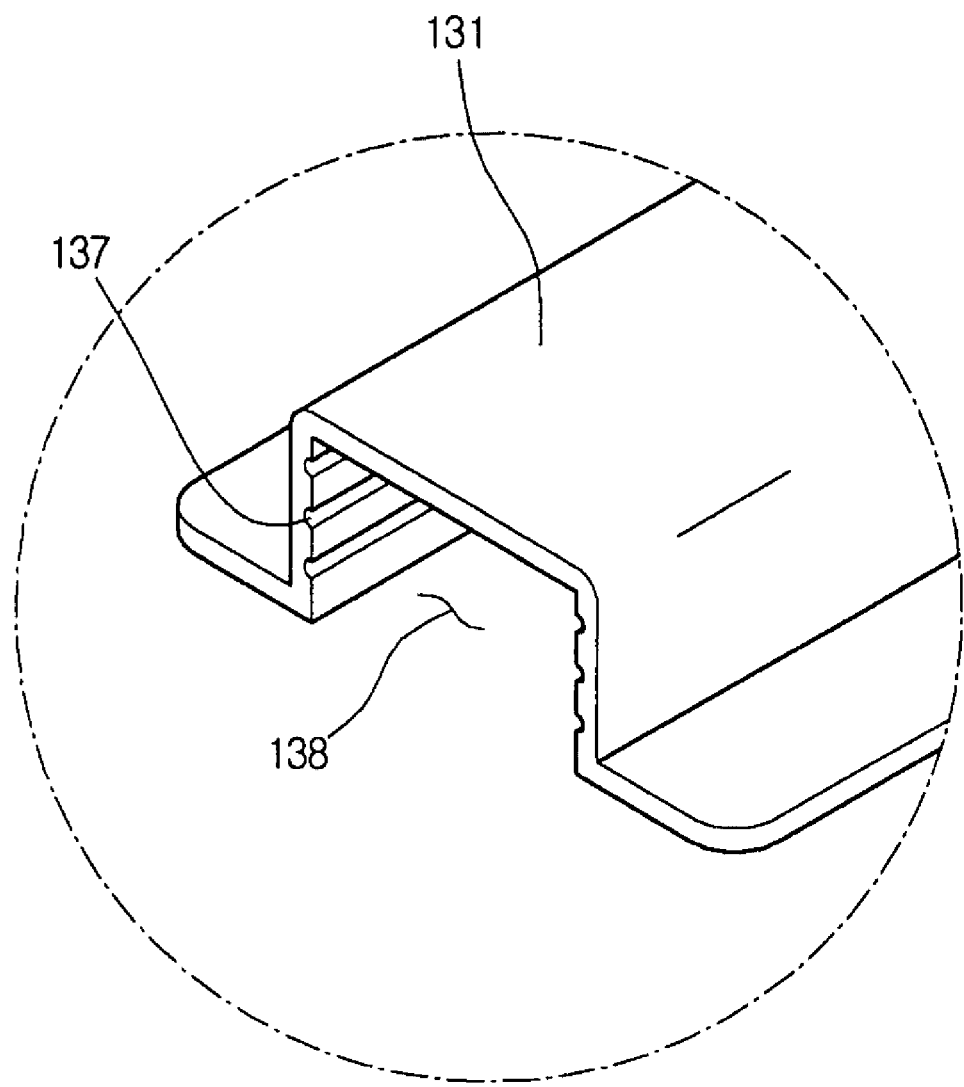
FIG. 6 is a detailed perspective view of a portion "A" in FIG. 5.
Figure 8:
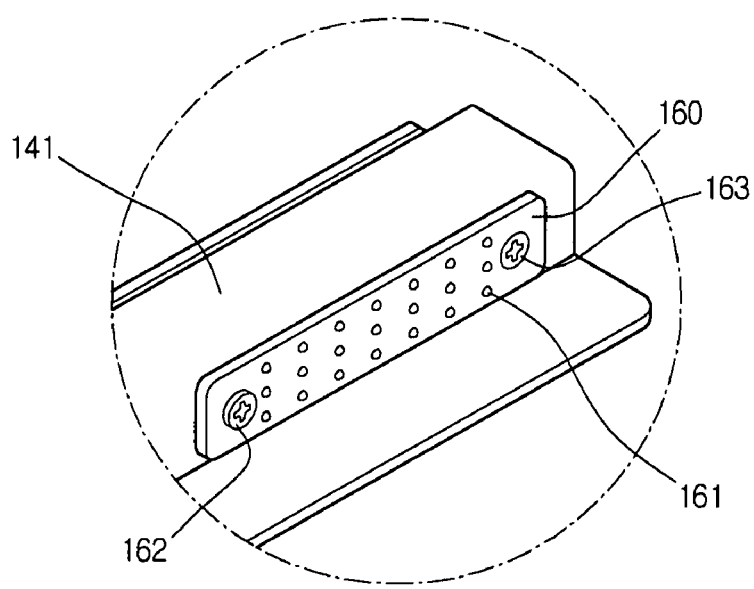
FIG. 8 is a detailed perspective view of a portion "B" in FIG. 7.
Figure 9:
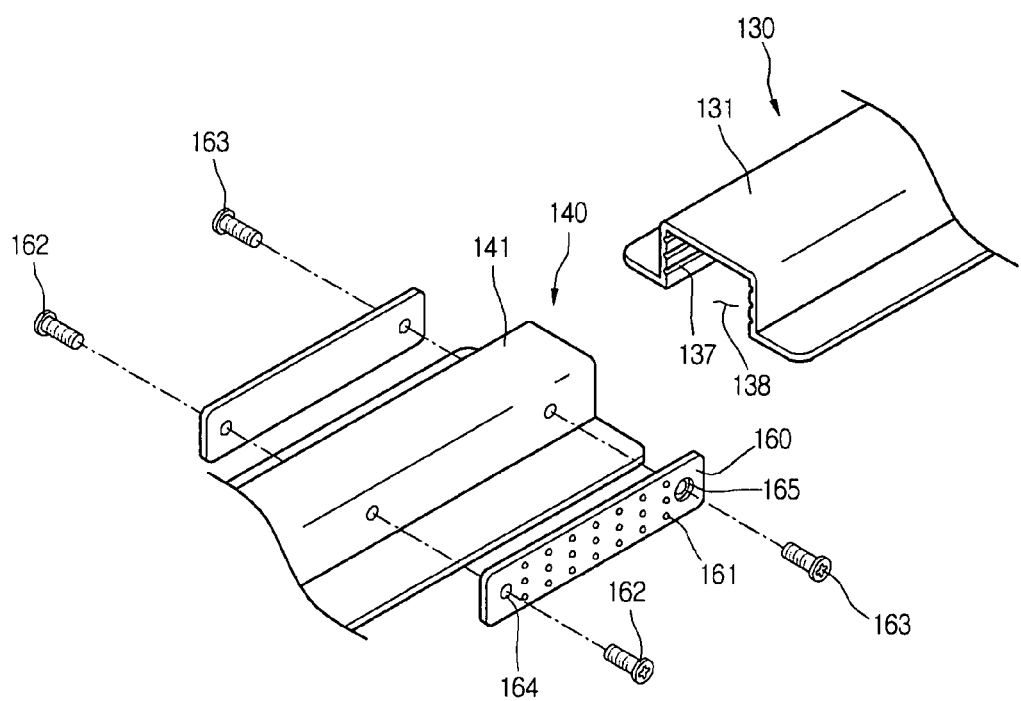
FIG. 9 is a perspective view showing a coupling structure of a first vertical frame in FIG. 5 and a second vertical frame in FIG. 8.

FIG. 5 is a perspective view showing a structure of a first vertical frame of a frame for a flat panel display device according to the present invention, FIG. 6 is a perspective view of a portion "A" in FIG. 5, FIG. 7 is a perspective view showing a structure of a second vertical frame of a frame for a flat panel display device according to the present invention, FIG. 8 is a perspective view magnifying "B" in FIG. 7, and FIG. 9 is a perspective view showing a coupling structure of a first vertical frame in FIG. 5 and a second vertical frame in FIG. 8.

Referring to FIGS. 5 and 6, the first vertical frame 130 includes a frame 131 forming a main body, a support section 132 protruded downwardly from one end of the frame, for supporting the first vertical frame 130, and a bent section which is bent at the end of the support section 132 and coupled with the first horizontal frame 110.

More particularly, the first vertical frame 130 is coupled with the second vertical frame 140 to form the vertical frame assembly 120. Furthermore, the vertical frame assembly 120 is coupled with the first and second horizontal frames 110 and 115 to form the structures of the frame assembly 100. Of course, it will be apparent that at least one of the vertical frame assembly 120 can be involved in relation with the use of the products. Various components of the display device, such as the PCB 190 or power board 180 will be coupled on the frame assembly 100.

The frame 131 has a receptor 138 substantially shaped in "⊓" to accommodate and couple the second vertical frame 140. That is, the second vertical frame 140 can slide into or withdraw from the receptor 138, so that the length of the vertical frame 120 can be adjusted.

One or more of guide rails 137 are arranged along the length of the frame 131 in the inner of the receptor 138. The guide rail 137 and a guide protrusion 161 run together to ensure a coupling of the first and second vertical frames 130 and 140 and guide the ingress and egress of the second vertical frame 140. Also, the support section 132 protrudes downwardly from one end of the frame 131. The support section 132 supports the first vertical 130, while the first vertical frame 130 is spaced from the first horizontal frame 110 by a distance so that the frame assembly 100 may support the secure position of the display module 200 and protect an interference by the various components and boards involved in the display module 200.

Furthermore, the support section 132 is bent at the end of the support section to form a bent section 133 in which a coupling hole is formed (not shown). As described above, the coupling hole and the guide slot 113 of the first horizontal frame 110 are coupled together by the separate coupling members such as bolt and nut or the like.

The frame 131 includes an insert slot 135 into which the supporting member 150 is inserted, and a coupling slot 136 through which a separate coupling member passes for joining together the frame 131 and the supporting member that is inserted into the insert slot 135. The coupling relation between the first vertical frame 130 and the supporting member 150 will be explained later with reference to FIG. 13.

Referring to FIGS. 7 and 8, the second vertical frame 140 has a shape similar to the first vertical frame 130.

In detail, the second vertical frame 140 includes a frame 141 forming a main body, a support section 142 extending downwardly from one end of the flame 141 to support the second vertical frame 140, and a bent section 143 which is bent at the end of the support section 142 and coupled with the second horizontal frame 115. A coupling hole 144 is further formed in the bent section 143 for being coupled with a coupling hole of the second horizontal frame 115. Furthermore, the frame 141 includes an insert slot 145 into which the supporting member 150 is inserted, and a coupling hole 146 through which a separate coupling member passes for coupling together the frame 141 and the supporting member 150 that is inserted into the insert slot 145.

In more detail, the frame 141 slides into the receptor 138 of the first vertical frame 130. For this, the width of the frame 141 is preferably the same or slightly less than that of width the receptor 138. Thus, the second vertical frame 140 slides into or withdraws from the first vertical frame 130, so that the entire length of the vertical frame assembly 120 can be adjusted.

Meanwhile, the guide member 160 is coupled to the frame 141 at the opposite end of the support section 142.

Particularly, the guide member 160 coupled to at least one side of the frame 141 has a substantially rectangular shape. The guide member 160 has at least one guide protrusion 161 at one side thereof. The guide protrusions 161 are supposed to be in harmony with the guide rails 137 of the first vertical frame 130, and thereby slide into the guide rail 137. As above, since the guide protrusion 161 is in harmony with the guide rail 137, the operating action of the first and second vertical frame 130 and 140 can be credibly achieved. A first coupling member 162 and a second coupling member 163 allow the guide members 160 to be coupled on the second vertical frame 140. The relation between the guide member 160 and the second frame 140 will be more minutely explained below.

Referring to FIG. 9, an assembling process of the vertical frame assembly 120 will be described as follows.

First, the second vertical frame 140 and the guide member 160 are coupled together. In detail, the guide member 160 has first and second coupling holes 164 and 165, wherein first and second coupling members 162 and 163 secure the guide member 160 to the second vertical frame 140.

The first coupling hole 164 is formed such that only a thread section of the first coupling member 162 can penetrate into the first coupling hole 164. In other words, a head of the first coupling member 162 is partially protruded from the surface of the guide member 160. While, the second coupling hole 165 is configured to accept even the head together with the thread section of the second coupling member 163. That is, the second coupling hole has a stair-like, cylindrical shape that can accept even the head of the second coupling member 163. Accordingly, the head of the second coupling will not protrude upwardly.

According to the structures describes above, the first coupling member 162 acts as a stopper which secures the guide member 160 to the second vertical frame 140, and at the same time, prevents the second vertical frame 140 from sliding into the first vertical frame 130 to an excessive degree.

Next, the second vertical frame 140 coupled with the guide member 160 is inserted into the first vertical frame 130. Herein, the guide protrusion 161 of the guide member 160 is designed to fit to the guide rail 137 of the first vertical frame 130, prevent the second vertical frame 130 from being derailed, and at the same time, guide the ingress and egress of the second vertical frame 140. Additionally, the first coupling member 162 prevents the second vertical frame 140 from excessively sliding into the first vertical frame.

Based on the structures described above, provided is a frame for the flat panel display device which can be applied to a variety of sizes of display modules. Furthermore, the present invention has an effect that realizes the frame sharing, and thereby reduces the cost and time taken in making a new mold for the development of a new frame.

Figure 10:
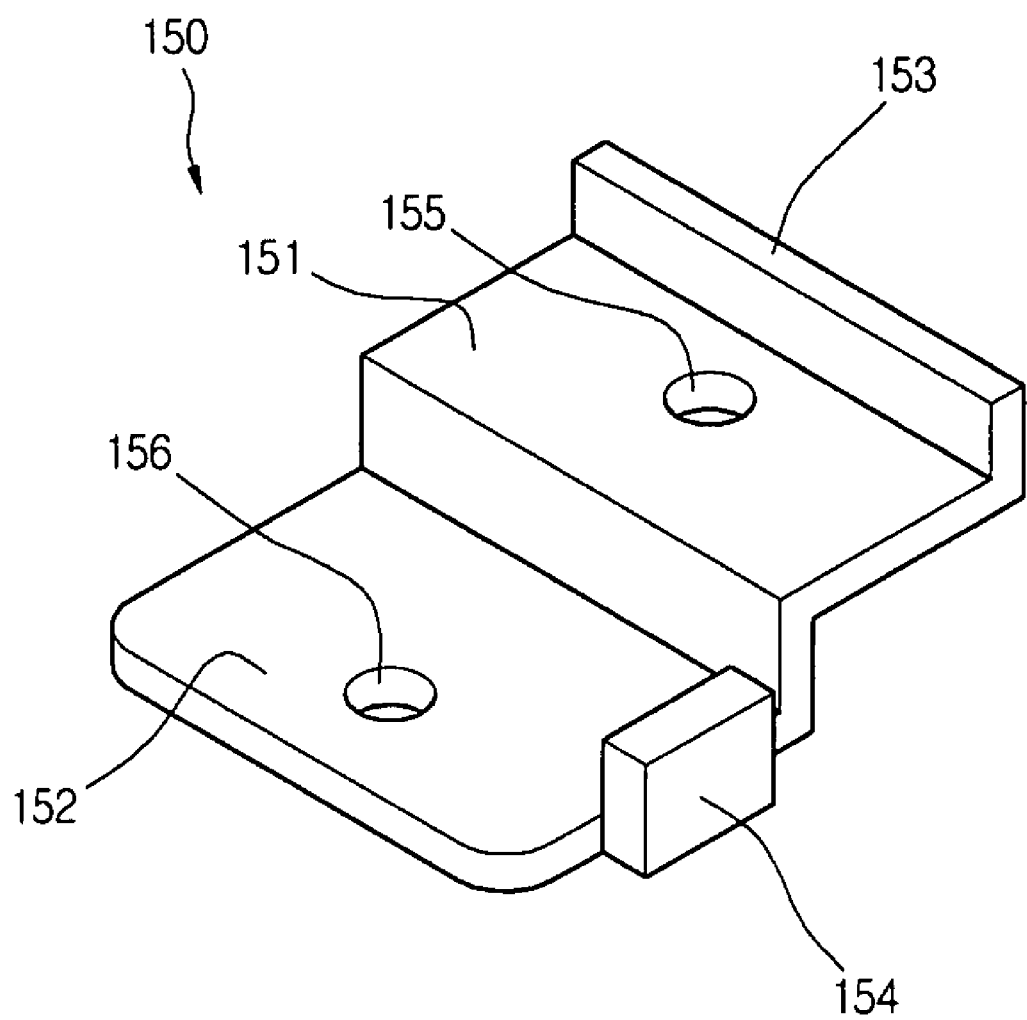
FIG. 10 is a perspective view showing a structure of a supporting member of a frame for a flat panel display device according to the present invention.

FIG. 10 is a perspective view showing a structure of a supporting member of a frame for a flat panel display device according to the present invention.

Referring to FIG. 10, a supporting member 150 includes a first plane 151 and a second plane 152 which have a stair-like shape, a separation protector 153 which protrudes upwardly from the first plane 151 and goes into the insert slots 135 and 145 of the vertical frame assembly 120, and a position securing section 154 which protrudes upwardly from the second plane 152 to a certain extent and supports the secure positions of boards such as a PCB mounted to the supporting member 150.

Also, the first plane 151 has a first coupling hole 155 which is connected to a coupling hole 136 or 146 of the vertical frame assembly 120, and the second plane 152 has a second coupling hole 156 which is connected to main board 180, PCB and the like.

Figure 11:
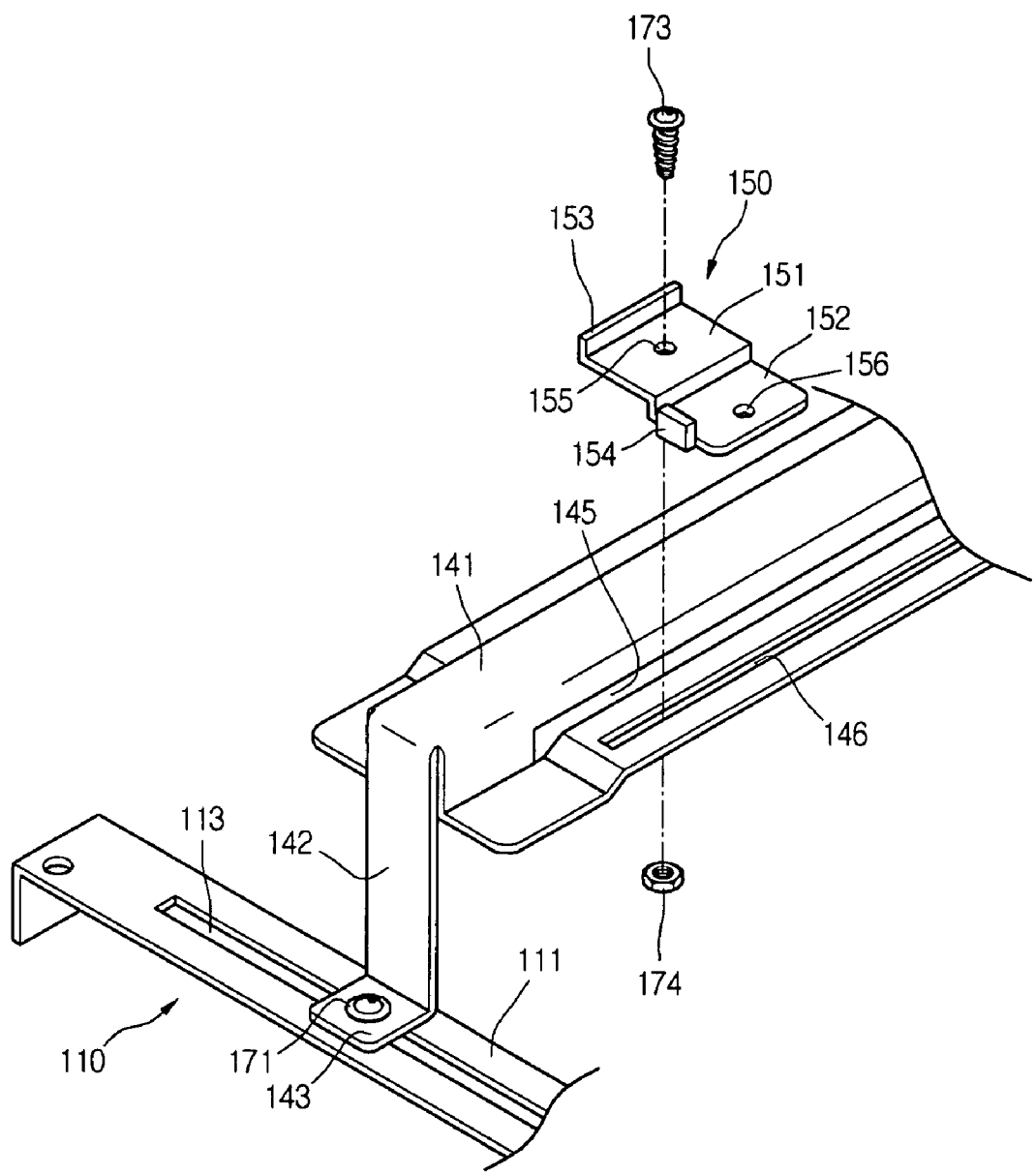
FIG. 11 is a perspective view showing a coupling structure of a horizontal frame, a vertical frame and a supporting member.

FIG. 11 is a perspective view showing a coupling structure of a horizontal frame, a vertical frame and a supporting member.

Referring to FIG. 11, a guide slot 113 of the first horizontal frame 110 and a coupling hole of the first vertical frame, and a guide slot of the second horizontal frame 115 and a coupling hole 144 of the second vertical frame are coupled together by each coupling members 171.

Herein, the guide slot 113 is formed in a lengthwise direction of the horizontal frames 110 and 115, so that a vertical frame assembly can be connected to any position of the horizontal frame. Preferably, the above coupling between the horizontal frames 110 and 115, and the vertical frame assembly 120 can be performed in a way that they are coupled together at a predetermined position by a jig. By the method described above, the horizontal frames 110 and 115, and the vertical frame assembly 120 can be exactly joined at a desired location. In the case of applying the frame assembly 100 to even a variety of sizes of display module or PCB, the present invention has the advantage of realizing the frame sharing only by selecting the coupling position between the horizontal frames 110 and 115, and the vertical frame assembly 120 using the jig.

Meanwhile, a process by which a supporting member 150 is coupled with the vertical frame assembly 120 is as follows.

First, a separation preventing member 153 of the supporting member 150 is inserted into the insert slots 135 and 145. In detail, the supporting member 150 is erected vertically, so that the separation preventing member 153 can be parallel to, and then inserted into the insert slots 135 and 145. Next, with the separation preventing member 153 inserted, the supporting member 150 is downwardly pressed such that the first coupling hole 155 contacts the coupling slots 136 and 146. And then, the supporting member 150 is securely coupled with the vertical frame assembly 120 using separate bolt 173 and nut 174 which penetrate through the first coupling hole 155 and coupling slots 136 and 146.

Herein, since the insert slots 135 and 145, and the coupling slots 136 and 146 are formed in a lengthwise direction of the vertical frame assembly 120, the supporting member 150 can be coupled at any position of the vertical frame assembly 120.

According to the structures described above, the present invention has an effect that a variety of sizes and shapes of components, such as PCB, main board and the like can be coupled with the frame assembly 100.

Figure 12:
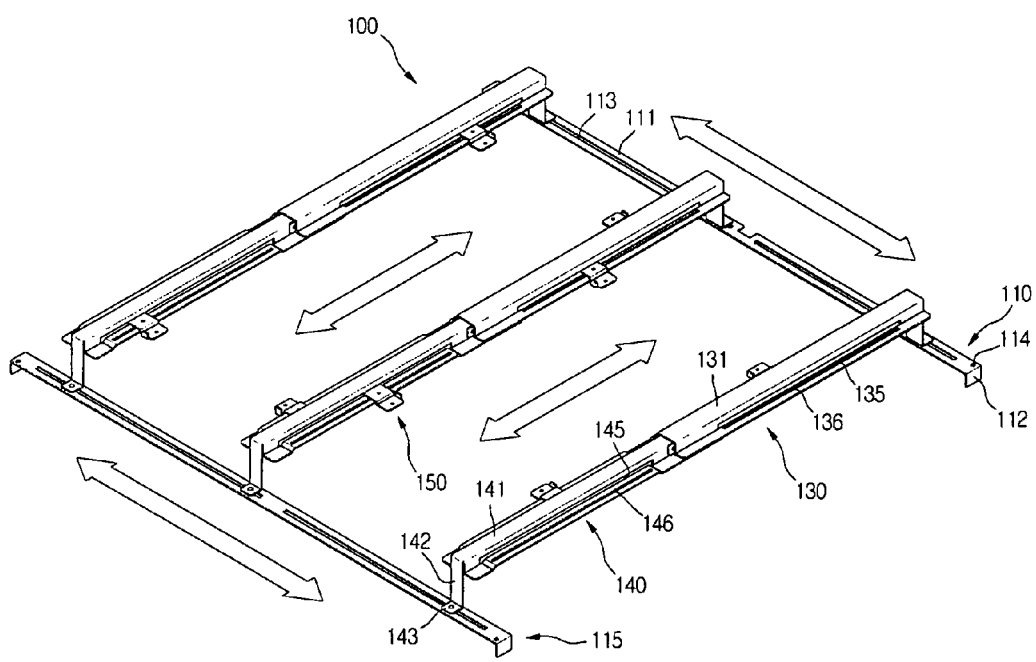
FIG. 12 is a perspective view showing a movement of a frame assembly of a flat panel display device according to the present invention.

FIG. 12 is a perspective view showing a movement of a frame assembly of a flat panel display device according to the present invention.

Referring to FIG. 12, the frame assembly 100 of the flat panel display device according to the present invention, includes a first horizontal frame 110 forming an upper end of the frame assembly 100, a second horizontal frame 115 forming a lower end of the frame assembly 100, and one or more of vertical frame assemblies 120 which are located between the first horizontal frame 110 and the second horizontal frame 115. The vertical frame assembly 120 includes a supporting member 150 on which a PCB, a power board and the like are mounted.

In detail, the first and second horizontal frame 110 and 115 have a longitudinal guide slot 113 with which the upper and lower ends of the vertical frame assembly 120 are coupled. Since the vertical frame assembly 120 can be coupled with any position on the guide slot 113, PCBs having various sizes and shapes can be coupled with the vertical frame assembly 120 by selecting their secure positions.

Meanwhile, the vertical frame assembly 120 includes a first vertical frame 130, and a second vertical frame 140 which slides into and withdraws from a receptor 138 of the first vertical frame 130. As above, the second vertical frame 140 slides into and withdraws from the first vertical frame 130, so that the entire length of the vertical frame assembly 120 can be adjustable. Accordingly, provided is the frame assembly 100 which can be applied to various display modules having different sizes.

Additionally, since the vertical frame assembly 120 has insert slots 135 and 145 and coupling slots 136 and 146 formed in a lengthwise direction thereof such that the supporting member 150 may be coupled at any position in which the insert slots 135 and 145 and the coupling slots 136 and 146 are formed, PCBs in various sizes and shapes may be coupled to the vertical frame assembly 120.

According to the present invention, it can be shown that the length and position of the vertical frame assembly are changeable, while the length of the vertical frame assembly is unchanged but the position of the vertical frame assembly may be changeable in harmony with the change of the length of the vertical frame assembly. However, the present invention is not limited to the above structure. In other words, it will be also possible to propose a modification that the length of the horizontal frame is changeable from the spirit of the present invention. However, since the object of changing the length of the horizontal frame can be attained by allowing the display module to have a structure supporting the horizontal frame instead of changing the length of the horizontal frame, there is not so much need to do so.

Also, while the present invention shows and describes that the secure position and the length of the vertical frame assembly are variable in harmony with the horizontal frame assembly, the present invention is not limited thereto. For example, it can be easily supposed that the spirit of the present invention can be equally implemented by changing the secure position and length of the horizontal frame assembly.

Furthermore, the horizontal frame assembly can be formed only at any one of upper and lower sides of the display module. In this case, it is possible to supply an intrinsic securing unit supporting the horizontal frame assembly to a side where the horizontal frame assembly is not provided.

As described above, according to the present invention, PCBs and display modules in a variety of sizes and shapes can be mounted to the frame for the flat panel display device. Moreover, since the horizontal and vertical lengths of the frame and the secure position of the supporting member involved in the frame are changeable, the frame sharing is possible. Also, through the frame sharing, the cost and time taken in making a new mold for the development of a new frame can be reduced. Furthermore, since only the chassis of the frame is made of steel plate, a use amount of the steel plate is saved and according the manufacturing cost and product weight are reduced, thereby obtaining effects of easy storage and reduction in logistics cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A frame for a flat panel display device, comprising:
   a first frame extending in a first direction and having a coupling section formed in a lengthwise direction of the first frame;
   a second frame spaced apart by a predetermined distance from the first frame, extending in the first direction and including a coupling section formed in a lengthwise direction of the second frame; and
   at least one third frame extending in a second direction crossing the first direction and coupled with the coupling sections of the first and second frames.

2. The frame for the flat panel display device according to claim 1, wherein a secure position of the third frame is changeable within a lengthwise range of the coupling section.

3. The frame for the flat panel display device according to claim 1, wherein the length of the third frame can be adjusted.

4. The frame for the flat panel display device according to claim 1, wherein the first direction is a horizontal direction.

5. The frame for the flat panel display device according to claim 1, wherein the first direction in which the first and second frames extend is perpendicular to the second direction in which the third frame extends.

6. The frame for the flat panel display device according to claim 1, wherein the third frame comprises at least three frames.

7. A frame for a flat panel display device, comprising:
   at least two vertical frame assemblies; and
   at least one horizontal frame coupled to at least one of the vertical frame assemblies and extending in a direction,
   wherein the at least two vertical frame assemblies comprise:
   a first vertical frame extending in a direction; and
   a second vertical frame which can overlap the first vertical frame to slide into or withdraw from the first vertical frame.

8. The frame for the flat panel display device according to claim 7, wherein the horizontal frame comprises a guide slot in a lengthwise direction of the horizontal frame such that the vertical frame assembly can be coupled with the horizontal frame.

9. The frame for the flat panel display device according to claim 7, wherein the first and second vertical frames have a depressed groove on one side of the first and second vertical frames and a protrusion corresponding to the groove on the other side of the first and second vertical frames.

10. The frame for the flat panel display device according to claim 9, wherein the groove and protrusion each are formed in plurality in a lengthwise direction of the first and second vertical frames.

11. The frame for the flat panel display device according to claim 7, further comprising:
   one or more of guide rails formed at a receptor of the first vertical frame; and
   a guide member engaged with the guide rail, for guiding a mutual movement of the two vertical frames.

12. The frame for the flat panel display device according to claim 11, wherein the guide member has a protruded stopper formed on one side thereof, for preventing the second vertical frame from excessively overlapping the first vertical frame.

13. The frame for the flat panel display device according to claim 11, wherein the guide member has a protrusion corresponding to a groove of the guide rail.

14. The frame for the flat panel display device according to claim 7, further comprising at least one supporting member coupled with the vertical frame assembly.

15. A frame for a flat panel display device, comprising:
a first horizontal frame;
a second horizontal frame; and
a vertical frame assembly coupled in a direction substantially perpendicular to the first and second horizontal frames at positions which are variable such that the length of the vertical frame assembly can be changed.

16. A flat panel display device, comprising:
a flat display module on which an image is provided;
a front panel protecting a front face of the flat display module;
a back cover protecting a rear face of the flat display module;
a frame assembly provided in a extensible form on the rear face of the flat display module; and
at least one board supported by the frame assembly.

17. The flat panel display device according to claim 16, wherein the board comprises an image driving board or a power supply board.

18. The flat panel display device according to claim 16, wherein the frame assembly comprises at least two different types provided in directions crossing each other, and at least one type of the at least two different types is an extensible type.

19. The flat panel display device according to claim 16, wherein the frame assembly comprises at least two different types provided in directions crossing each other, and at least one type of the at least two different types is configured to be coupled with the other at various positions.

20. The flat panel display device according to claim 16, wherein a separate supporting member is provided at the position where the board and the frame assembly are coupled together.

* * * * *